Nov. 8, 1960 W. J. METZGER 2,959,300
TRANSITIONAL COUPLING MECHANISM
Filed Nov. 28, 1958

INVENTOR.
BY WILLIAM J. METZGER
Henry Kozak
ATTORNEY

United States Patent Office 2,959,300
Patented Nov. 8, 1960

2,959,300

TRANSITIONAL COUPLING MECHANISM

William J. Metzger, East Cleveland, Ohio, assignor to National Malleable and Steel Castings Company, Cleveland, Ohio, a corporation of Ohio Filed Nov. 28, 1958, Ser. No. 776,784

11 Claims. (Cl. 213—112)

This invention relates generally to railway car couplers and more particularly to a transitional coupling device for adapting railway cars equipped with automatic couplers for coupling with railway cars not equipped for automatic coupling.

When a new coupler is favorably received by the trade and approved as more or less standard equipment, a transition period occurs during which the new coupler is substituted for existing designs. A transition period is generally rather lengthy, due primarily to the cost involved in the change-over of equipment to the new coupler. The change-over to the new approved coupler is gradual and it is common, during this period, to have railway cars equipped with both the new couplers and existing couplers in the same railway system. Consequently, a transitional coupling mechanism becomes necessary so that railway cars with existing couplers may be coupled to cars provided with the new couplers in the same train connection.

As is known, the adoption of the automatic coupler led directly to various inventions in transitional coupling devices. These inventions permit automatic couplers of both the rigid-jawed and knuckle types to be coupled with non-automatic couplers, such as the draw-hook and side buffer couplers.

In applicant's co-pending application, Serial No. 613,133, filed October 1, 1956, there is disclosed and claimed a novel automatic car coupler particularly adapted for use on lightweight trains. As a special feature, this coupler embodies structure for the automatic coupling of train service line connections and, for this reason, has become known as the connector coupler. Therefore, throughout this description, the term "connector coupler" will be used to designate the novel automatic coupler of the above mentioned co-pending application. Further, the connector coupler is fully disclosed in detail in the indicated co-pending application and the present description shall make mention of only those structural details necessary to the clear and full understanding of the present invention. The connector coupler, being of a construction different from standard automatic couplers, does not lend itself for effective coupling to non-automatic couplers through use of existing transitional coupling mechanisms.

It is, therefore, a primary object of this invention to provide a transitional coupling mechanism which will permit the connector coupler to be coupled to non-automatic couplers.

Another object of this invention is to provide a novel coupling adapter member capable of use with elements of existing coupling mechanisms.

A more specific object of this invention is to provide a transitional coupling mechanism comprising a novel coupler adapter member having means at one end for coupling engagement with a connector coupler and means on the opposite end for receiving the hook or clevis of a coupling device commonly used in existing coupling mechanisms in various parts of the world.

These and other objects will become more apparent upon a reading of the following description considered and interpreted in the light of the accompanying drawings, in which.

Figures 1, 2, 3, 4, 5:
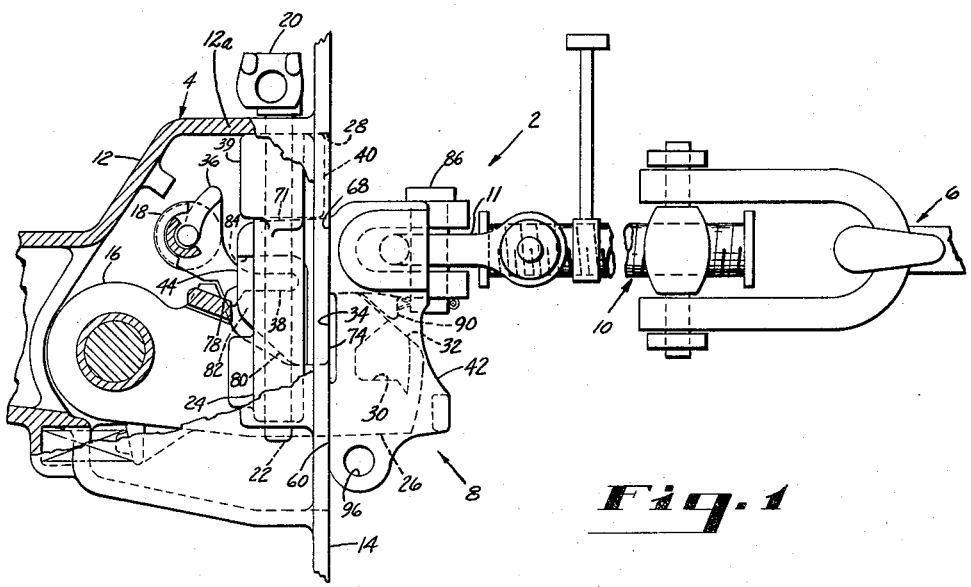
Fig. 1 is a top view, partially in section, showing the novel transitional coupling mechanism of this invention connecting together, in coupling relationship, a connector coupler and a non-automatic draw-hook coupler.
Fig. 2 is a top plan view of the novel coupling adapter member of this invention.
Fig. 3 is a side view of the coupling adapter member.
Fig. 4 is a front view thereof.
Fig. 5 is a perspective view of the coupling adapter member.

Referring now to the drawings, Fig. 1 discloses the transitional coupling mechanism 2 connecting together, in coupling relationship, a connector coupler 4 and a draw hook 6. The coupling mechanism 2 comprises the coupling adapter member 8 and the commonly used turnbuckle or screw coupling element 10. In this regard, it is to be understood that the screw coupling element 10 has been selected for purposes of illustration only. As will become obvious, any coupling device using a hook, chain link, clevis or similar structure for attachment to associated elements may be substituted for the illustrated screw coupling 10 and employed with the adapter member 8 in achieving the transitional coupling mechanism of this invention.

Connector coupler 4, in brief summary, is constructed with a hollow head portion 12 and a flat front face plate 14. Disposed within the head is a pivotal coupling hook 16 and a pivotally mounted cam 18. A rotor shaft member 20 extends through an opening on a side wall of the head and has a shank portion 22 which extends transversely interiorly of the head 12. Lock 24 is mounted on shank portion 22 and is keyed thereto for actuation by rotor shaft 20. Coupling hook 16 includes a head portion 26 extending through a transverse opening 28 on front plate 14. Head portion 26 comprises a front face recess 30, a surface 32 tapering sharply forwardly, and rearwardly facing bearing surface 34. Cam 18 consists of a vertical wall 36 and a horizontally extending arm 38. Lock 24 has an actuating portion 39 which includes a forwardly and downwardly sloping cam surface 40. When coupling with a similar opposing coupler, the opposing hook contacts hook 16, slides along rearwardly tapering surface 32, enters the right-hand side of opening 28, engages actuating portion 38 of lock 24 and rotates the lock rearwardly. As soon as bearing surface 34 is fully engaged with a similar surface on the opposing hook, lock 24 quickly rotates by gravity back to locking position wherein portion 39 is disposed between a side surface of the opposing hook and side wall 12a of the head 12 to thus retain the opposing couplers in coupled engagement. In coupled position, arm 38 of cam 18 lies within a recess, similar to recess 30 on head portion 26 of hook 14, on the opposing hook. In uncoupling, actuation of shaft 20 swings lock actuating portion 39 rearwardly in such a manner that the surface 40 contacts vertical wall 36 of cam 18, causing the latter to rotate so that the arm 38 engages a side surface of the recess in an opposing hook to thereby move the opposing hook out of coupling engagement.

Coupler adapter member 8 comprises a body portion 42 and an integral hook-shaped section 44. Body portion 42 is constructed with a top wall 46, a bottom wall 48, and transversely spaced vertical walls 50 and 52. A wall 54 joins vertical walls 50 and 52 at their forward end. The top and bottom walls 46 and 48 extend laterally outwardly from one side of vertical wall 50 to define a housing 56. Housing 56 is open on all other sides except for the web 58 which is provided for reasons of strength and to maintain the vertical spacing between top wall 46 and bottom wall 48 constant. Each wall 46 and 48 is provided with a forwardly facing abutment surface 60 for a purpose which will hereinafter become clear.

Top wall 46, between the vertical walls 50 and 52, is arcuately formed so as to provide a hood 62. Hood 62, together with walls 50, 52, and 54, defines a rearwardly opening hook-receiving cavity or pocket 64. Bottom wall 48, opposite the hood 62, is slotted as at 66 to provide an open bottom in the cavity 64.

Hook-shaped section 44 is disposed forwardly of body portion 42 and is integrally joined thereto at wall 54. Hook section 44 is offset with respect to top wall 46 and bottom wall 48 resulting in additional forwardly facing abutment surfaces 68 laterally spaced from abutment surfaces 60.

Hook section 44 comprises a forwardly extending side wall 70, a laterally extending rear wall 72 defining a rearwardly facing bearing or pulling surface 74, and a horizontal connecting wall 76. Wall 76 is disposed intermediate the top and bottom of walls 70 and 72 (best seen in Fig. 5) and defines a front end face 78 and a rearwardly tapering surface 80. Disposition of the wall 76 intermediate the top and bottom of the side and rear walls 70 and 72 not only lightens hook-shaped section 44 but also provides, in effect, a bottom recess 82 and a bearing surface 84 on the inner side of side wall 70 which cooperate with the cam leg 38 in the head of coupler 4 in a manner hereinafter to be described.

During a coupling operation between a connector coupler and a screw type coupling or other similar device, the adapter member 8 may, of course, be first coupled with connector coupler 4. The hook-shaped section 44 of member 8 is manually inserted into the right-hand side of opening 28 in the front face of the coupler 4 and is urged forwardly until the surfaces 60 and 68 on the housing 56 abut against the front face plate 14. In this position, portion 39 of the lock 24 has been moved rearwardly by contact with hook-shaped section 44 and hook 16 of the coupler has been received within the open housing 56. Adapter member 8 is then moved laterally to the left so that the bearing surface 74 of hook section 44 is disposed forwardly of rearwardly facing surface 34 on hook 16 in position for pulling engagement therewith. Simultaneously, this lateral movement results in hook section 44 being moved out of contact with portion 39 of the lock, causing the lock 24 to rotate quickly back by gravity to locking position with portion 39 thereof falling between the face 71 of wall 70 and side wall 12a of coupler head 12 to thereby secure the coupling engagement between the adapter member 8 and the coupler 4. It will be observed that when a coupling position is achieved, as described, the arm 38 of cam member 18 is disposed within the recess 82 of hook section 44, as is clearly illustrated in Fig. 1.

The connection between coupler 4 and the screw coupling is completed by inserting in the embodiment shown, the clevis 11 of the screw coupling into the cavity 64 where it is retained in connecting relationship by means of a pin 86 inserted through aligned openings 88 in the vertical walls 50 and 52 on the body portion 42 of the adapter member 8. The clevis 10a of the screw coupling is then connected to draw-hook 6, after which the slack existing in the coupling arrangement is taken up in well-known manner.

In practice, it will probably be found preferable to retain coupler adapter member 8 and screw coupling 10, or other similar device, connected together as a unit. Such an expedient would promote efficiency and save time during a coupling operation. When used in this fashion, adapter member 8 and screw coupling 10 will, of course, be coupled to coupler 4 and draw head 6, respectively, in the same manner as described above.

When it is desired to uncouple, the uncoupling rod (not shown) of coupler 4 is actuated, thus rotating rotor member 20. Since lock 24 is keyed to the shank of rotor 20, the portion 39 of the lock is swung rearwardly into the coupler head. As the portion 39 swings rearwardly, cam surface 40 thereon engages vertical wall 36 on uncoupling cam member 18, thereby causing the cam to pivot in a counterclockwise direction, as viewed in Fig. 1. Thereupon, arm 38 on the cam engages bearing surface 84 in the recess 82 of hook section 44 to thereby cause adapter member 8 to be moved laterally toward wall 12a to a position in which it can be separated from the coupler 4 through the right-hand side of opening 28.

It is not necessary that the trainman hold onto the uncoupling rod during the uncoupling operation. Once the adapter member 8 has been moved to the right-hand side of opening 28, it is clear of the hook 16 and may be separated from the coupler 4 without any further actuation of the uncoupling rod. In fact, in this position of the parts, the coupler 4 is in a condition known as "lock set" in the art. Portion 39 of the lock 24 is prevented from rotating to locking position because it is held in its rearward position by contact with hook section 44. Withdrawal of the adapter member 8 from the right-hand side of opening 28 permits the lock 24 to rotate back to locking position and places the coupler 4 in readiness for coupling.

As may be seen in Figs. 1 and 2, a projection 90 extending into the housing 56 from vertical wall 50 is formed with a forwardly tapering surface 92, which is adapted for engagement with surface 32 on hook 16. When the adapter is in coupled position, the surface 92 lies closely adjacent surface 32 on hook 16 and in conjunction with the abutment surfaces 60 serves to limit horizontal angling of the adapter member 8 relative to the coupler.

The top and bottom walls of housing 56 are provided with aligned openings 96. If desired, a pin (not shown) may be inserted through the aligned openings 96 to prevent unintentional operation of the uncoupling mechanism. Obviously, the use of a pin in this manner will prevent the lateral movement of the adapter member 8 necessary to effect uncoupling.

The foregoing description and the accompanying drawings, therefore, disclose the invention of a novel transitional coupling mechanism permitting the connector coupler to be coupled to a non-automatic coupler in the same train connection. Also shown is the construction of a coupler adapter member which, at one end, will couple with the connector coupler and, at the opposite end, will receive the hook or clevis of existing coupling elements.

The terms and expressions which have been employed are used as terms of description and not of limitation and there is no intention of excluding such equivalents of the invention described or of the portions thereof as fall within the purview of the claims.

What is claimed is:

1. A transitional coupling mechanism for coupling together an automatic coupler and a draw-hook coupler, said mechanism comprising a coupler adapter member in combination with a coupling device, said coupling device being adapted for coupling with said draw-hook coupler at one end, and with said adapter member at the other end, said adapter member having hook-shaped means on one end engageable with said automatic coupler in coupled relation therewith and a cavity on the other end adapted to receive said coupling device in connectable relationship.

2. A coupler adapter member as defined in claim 9 wherein said body portion has a rearwardly opening cavity for receiving an associated coupling device in connected relationship and a laterally extending housing for receiving the coupling hook of an associated automatic coupler.

3. A coupler adapter member as defined in claim 2 wherein said cavity is defined by a pair of transversely spaced vertical walls connected together by a hooded top wall and said body portion being defined by a top and a bottom wall extending laterally from one said vertical wall.

4. A coupler adapter member as defined in claim 2 wherein said hook-shaped section comprises a forwardly extending side wall, a laterally extending rear wall, and a horizontal wall disposed intermediate the top and bottom of said side and rear walls, said rear wall having a rearwardly facing bearing surface disposed for pulling engagement with a similar surface on the coupling hook of an associated automatic coupler.

5. A transitional coupling mechanism for coupling together an automatic coupler and a draw-hook coupler, comprising a coupler adapter member and a coupling device, said coupler adapter member including a body portion and a hook-shaped section extending forwardly therefrom, said body portion having a rearwardly opening cavity and a laterally extending open housing, said coupling device adapted for coupling at one end to said draw-hook coupler and being received at the opposite end in said cavity in connected relationship with said coupler adapter member, said hook-shaped section engaging said automatic coupler in coupling relationship.

6. A transitional coupling mechanism for coupling together an automatic coupler of the character described and a draw-hook coupler, comprising a coupler adapter member and a screw coupling, said coupler adapter member including a body portion and an integral hook-shaped section extending forwardly therefrom, said body portion having a rearwardly opening cavity and a laterally extending open housing, said screw coupling adapted for coupling at one end to said draw-hook coupler and being received at the opposite end in said cavity in connected relationship with said coupler adapter member, said hook-shaped section having a rearwardly facing bearing surface adapted for pulling engagement with a similar surface of an associated coupler hook in said automatic coupler.

7. A coupling adapter member for use in a transitional coupling mechanism, said member comprising a hook-shaped portion having a rearwardly facing pulling surface, a pair of spaced vertical walls extending rearwardly from said portion and being apertured to receive pivot means, and a housing portion disposed rearwardly of said surface adapted to receive the coupling hook of an automatic coupler in coupled relationship with said member, said housing portion comprising horizontal top and bottom walls integral with one of said vertical walls.

8. A coupling adapter member as defined in claim 7 in which a projection is provided in said housing portion for engagement with the coupling hook of an associated automatic coupler to limit horizontal angling of the member relative to the coupler when the member is in coupled relationship with the coupler.

9. A coupler adapter member for use in a transitional coupling mechanism comprising a body section having an integrally formed forwardly facing hook-shaped section, and on the rearward side of said member, a cavity being defined by a pair of spaced vertical walls extending rearwardly from said hook-shaped section for receiving said coupling-device in coupled relationship.

10. A transitional coupling mechanism for coupling together an automatic coupler and a draw-hook coupler, said automatic coupler having a hook-shaped member with a laterally extending pulling surface, said mechanism comprising an adapter member and a coupling device, said adapter member characterized by a body portion and a hookshaped section extending forwardly therefrom, said hookshaped section having a pulling surface complemental to said pulling surface on said automatic coupler for engagement therewith, said body portion having a rearwardly opening cavity disposed rearwardly of said hook-shaped section, and a pair of vertically spaced walls disposed transversely of said cavity, said walls having portions for abutting engagement with the automatic coupler.

11. A transitional coupling mechanism as set forth in claim 10 in which the vertically spaced walls of the adapter member receive therebetween the hook-member of the automatic coupler to preclude disengagement of the adapter member from the automatic coupler.

References Cited in the file of this patent
UNITED STATES PATENTS

| | | |
|---|---|---|
| 1,526,689 | Willison | Feb. 17, 1925 |
| 1,563,017 | Coffin | Nov. 24, 1925 |
| 1,599,038 | Bush | Sept. 7, 1926 |